US008675156B2

(12) United States Patent
Shin et al.

(10) Patent No.: US 8,675,156 B2
(45) Date of Patent: Mar. 18, 2014

(54) COLOR FILTER SUBSTRATE FOR LIQUID CRYSTAL DISPLAY, AND MANUFACTURING METHOD THEREOF

(75) Inventors: Se Jong Shin, Daegu (KR); Bong Chul Kim, Daegu (KR); Tae Hyung Lee, Daegu (KR); Hong Myeong Jeon, Gyeongsangbuk-do (KR); Jun Kyu Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 446 days.

(21) Appl. No.: 11/645,749

(22) Filed: Dec. 27, 2006

(65) Prior Publication Data

US 2007/0242193 A1 Oct. 18, 2007

(30) Foreign Application Priority Data

Apr. 14, 2006 (KR) ........................ 10-2006-0034154

(51) Int. Cl.
*G02F 1/1333* (2006.01)
*G02F 1/1335* (2006.01)

(52) U.S. Cl.
USPC .......................................... 349/106; 349/110

(58) Field of Classification Search
USPC .................................................. 349/106–111
See application file for complete search history.

(56) References Cited

U.S. PATENT DOCUMENTS

| 4,802,743 | A | * | 2/1989 | Takao et al. ................... 349/106 |
| 4,846,556 | A | * | 7/1989 | Haneda ........................ 359/891 |
| 5,610,736 | A | * | 3/1997 | Asai ............................... 349/42 |
| 6,806,925 | B2 | * | 10/2004 | Ishii et al. ..................... 349/106 |
| 2001/0007733 | A1 | * | 7/2001 | Matsuyama et al. .............. 430/7 |
| 2003/0001992 | A1 | * | 1/2003 | Kawase et al. ................ 349/106 |
| 2003/0076457 | A1 | * | 4/2003 | Sohn et al. .................... 349/106 |
| 2003/0227586 | A1 | * | 12/2003 | Okamoto et al. ............. 349/106 |
| 2004/0201048 | A1 | * | 10/2004 | Seki et al. ..................... 257/294 |
| 2004/0227894 | A1 | * | 11/2004 | Kim et al. ..................... 349/145 |

FOREIGN PATENT DOCUMENTS

| JP | 4-336501 A | 11/1992 |
| JP | 2004-184664 A | 7/2004 |
| WO | 99/48339 A1 | 9/1999 |

OTHER PUBLICATIONS

Office Action, along with its English-language translation, issued in corresponding Japanese Application No. 2006-337875.

* cited by examiner

*Primary Examiner* — Jessica M Merlin
(74) *Attorney, Agent, or Firm* — Morgan, Lewis & Bockius LLP

(57) ABSTRACT

A color filter substrate for a liquid crystal display device includes a transparent insulation substrate, a black matrix defining first and second pixel areas on the transparent insulation substrate, and a color filter in the first and second pixel areas for displaying first and second colors, respectively, wherein a surface of the black matrix having recesses at sides thereof adjacent to the first and second pixel areas, respectively, for preventing an overflow of the first color from the first pixel area into the second pixel area.

20 Claims, 5 Drawing Sheets

COLOR FILTER SUBSTRATE FOR LIQUID CRYSTAL DISPLAY, AND MANUFACTURING METHOD THEREOF

This application claims the benefit of the Korean Patent Application No. 10-2006-0034154 filed in Korea on Apr. 14, 2006, which is hereby incorporated by reference in its entirety.

BACKGROUND OF THE INVENTION

1. Field of the Invention

Embodiments of the present invention relates to a liquid crystal display device, a more particularly, to a color filter substrate for a liquid crystal display device and a manufacturing method thereof.

2. Description of the Background Art

As society is becoming more and more information-driven, demand has been increasing for diverse forms of display devices. Recently, diverse flat display devices have been studied, which include a liquid crystal display (LCD) device, a plasma display panel (PDP) device, an electro luminescent display (ELD) device, and a vacuum fluorescent display (VFD) device. Some of the flat display devices are currently in use in diverse forms of equipment.

In particular, the LCD device is most widely used as a portable display device because it provides an excellent image quality, is thin and light, and consumes low-power. In light of these advantages, the LCD is supplanting cathode ray tube (CRT) as a preferred display device. For example, LCD devices are used as monitors for televisions, desktop computers, and laptop computers. To be used as a general display device, the LCD device should remain thin and light, consume low-power, but also should be able to provide a high-quality image on a wide panel that has a high definition and a high brightness.

The LCD includes a liquid crystal display panel with liquid crystal cells in an active matrix arrangement, and driving circuits for driving the liquid crystal panel. The LCD device displays images by controlling the optical transmission rate of liquid crystal cells in accordance with inputted video signals. A color image is formed on a thin-film transistor liquid crystal display (TFT-LCD) device by adjusting the optical transmission rate of an incident white light from a backlight as the incident white light propagates through the liquid crystal pixels, and additively mixing colored light emitted from red (R), green (G), and blue (B) color filter layers, which are arranged in a ratio of 1:1 on the liquid crystal pixels.

FIG. 1 shows a cross-sectional view of an LCD panel according to the related art. Referring to FIG. 1, the related art LCD panel includes a TFT substrate 10, a color filter substrate 50 and a liquid crystal material 30 injected between the TFT substrate 10 and the color filter substrate 50.

In the case of a twisted nematic (TN) type LCD panel, the color filter substrate 50 is composed of a black matrix 52, a color filter 53, an overcoat 54, a common electrode 55, and a first alignment film 56, which are sequentially formed on a transparent first insulation substrate 51. Thus, the color filter substrate 50 includes not only the RGB color filter pattern 53 for displaying colors but also an indium titanium oxide (ITO) thin film 55, which is a common electrode for applying voltage to the liquid crystal pixels, and the black matrix 52 which blocks the light between unit pixels. Also, the TFT substrate 10 may include a TFT pixel electrode 17 and a second alignment film 19 formed on a transparent second insulation substrate 11. In case of an in-plane switching (IPS) type liquid crystal display panel, both the common electrode 55 and the pixel electrode 17 may be formed on the TFT substrate 11.

FIG. 2 shows a cross-sectional view of a color mixture caused during fabrication of a color filter for the LCD panel according to the related art. Referring to FIG. 2, a black matrix 52 defining a pixel area is formed on a transparent insulation substrate 51, and a color filter 53 for displaying different colors is formed in the pixel area. The color filter uses a color photo resist (PR) including a pigment or a color ink in an ink-jet method. As shown in portion A of FIG. 2, dripping ink or color photo resist may cause an overflow in the related art method. The overflow may cause an unintended mixture of colors.

SUMMARY OF THE INVENTION

Accordingly, the present invention is directed to a color filter substrate for liquid crystal display panel and a method of manufacturing thereof, which substantially obviate one or more problems due to limitations and disadvantages of the related art.

An object of the present invention to provide a color filter substrate for a liquid crystal display device that can prevent an unintended mixture of colors due to an overflow of a color filter material.

Another object of the present invention to provide method of manufacturing a color filter substrate for a liquid crystal display device that can prevent an overflow of a color filter material due to a dripping of ink or a color photo resist.

Additional features and advantages of the invention will be set forth in the description of exemplary embodiments which follows, and in part will be apparent from the description of the exemplary embodiments, or may be learned by practice of the exemplary embodiments of the invention. These and other advantages of the invention will be realized and attained by the structure particularly pointed out in the written description of the exemplary embodiments and claims hereof as well as the appended drawings.

To achieve these and other advantages and in accordance with the purpose of the present invention, as embodied and broadly described, a color filter substrate for a liquid crystal display device includes a transparent insulation substrate, a black matrix defining first and second pixel areas on the transparent insulation substrate, and a color filter in the first and second pixel areas for displaying first and second colors, respectively, wherein a surface of the black matrix having recesses at sides thereof adjacent to the first and second pixel areas, respectively, for preventing an overflow of the first color from the first pixel area into the second pixel area.

In another aspect, a method for manufacturing a color filter for a liquid crystal display device including a transparent insulating substrate includes forming a black matrix defining first and second pixel areas on the transparent insulation substrate, forming a color filter in the first and second pixel areas for displaying first and second colors, and forming recesses on a surface of the black matrix at sides thereof adjacent to the first and second pixel areas, respectively, for preventing an overflow of the first color from the first pixel area into the second pixel area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this application, illustrate embodiments of the present invention and together with the description serve to explain the principle of embodiments of the present invention. In the drawings.

DETAILED DESCRIPTION OF EXEMPLARY EMBODIMENTS

Reference will now be made in detail to exemplary embodiments of the present invention, which are illustrated in the accompanying drawings. Wherever possible, the same reference numbers will be used throughout the drawings to refer to the same or like parts.

Figure 1:
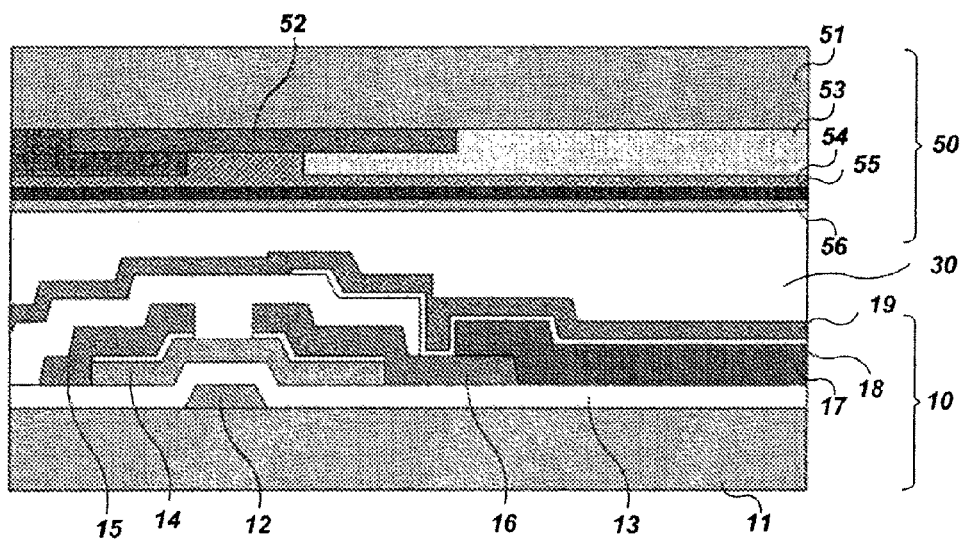
FIG. 1 shows a cross-sectional view of an LCD panel according to the related art.
Figure 2:
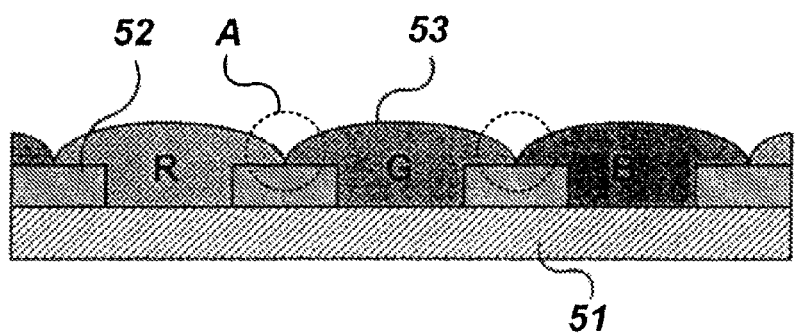
FIG. 2 shows a cross-sectional view of a color mixture caused during fabrication of a color filter for the LCD panel according to the related art.
Figure 3:
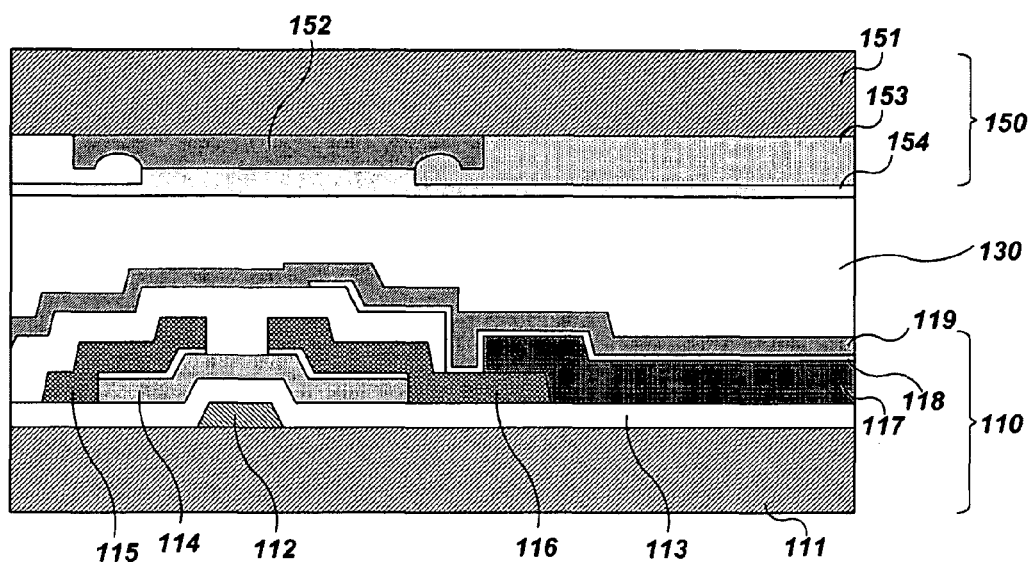
FIG. 3 shows a cross-sectional view of an exemplary LCD panel in accordance with an embodiment of the present invention.

FIG. 3 shows a cross-sectional view of an exemplary LCD panel in accordance with an embodiment of the present invention. Referring to FIG. 3, the exemplary LCD panel includes a TFT substrate 110, a color filter substrate 150 and a liquid crystal material 130 between the TFT substrate 110 and the color filter substrate 150. The color filter substrate 150 may include a black matrix 152 and a color filter 153 sequentially formed on a first transparent insulation substrate 151. The color filter substrate 150 may further include an overcoat layer 154.

The TFT substrate 110 may include a plurality of TFTs, a pixel electrode 117, and an alignment film 119 on a second transparent insulation substrate 111. In an exemplary embodiment of the invention, the LCD panel is an IPS type, in which the pixel electrode 117 and the common electrode (not shown) can be formed on the TFT substrate 110.

The black matrix 152 of the color filter substrate 150 is disposed on the first transparent insulation substrate 151 in areas corresponding to TFT areas of the TFT substrate 110, areas where a plurality of gate lines are formed, and areas where a plurality of data lines are formed. The black matrix 152 defines pixel areas where the color filter 153 is to be formed. Herein, the black matrix 152 improves image quality by preventing the leakage of light and absorbing external light to increase an effective contrast ratio of the LCD panel.

In an exemplary embodiment of the invention, a portion of the surface of the black matrix 152 is shaped appropriately to prevent overflow during the formation of the color filter 153. For example, the surface of the black matrix 152 is provided with well-shaped recesses on each side thereof adjacent to one or more of the pixel areas. Other embodiments of the present invention may include recesses with other shapes.

The black matrix 152 may be formed of a resin, which is an organic material, or metal. When the black matrix 152 is formed of a resin, the overflow preventing recess may be formed by light exposure through a plurality of slits. When the black matrix 152 is a metal thin film, it may be formed through dry etching or wet etching.

The color filter 153 may be formed over pixel areas separated by the black matrix 153, and the color filter 153 may be formed for each of the R, G and B areas to display R, G and B colors. The color filter 153 is formed by using a color photo resist containing a pigment or by dripping a color ink in an ink-jet method. Thus, the overflow preventing recess of the black matrix 152 prevent an overflow of the color ink or the color photo resist.

The overcoat layer 154 may be formed to cover the color filter 153 to planarize the color filter substrate. In an embodiment, the overcoat layer 154 may not be formed.

Subsequently, the TFT in the TFT substrate 110 includes a gate electrode 112 formed on the transparent second insulation substrate 111 together with gate lines (not shown), a semiconductor layer 114 overlapped with the gate electrode 112, a gate insulation layer 113 between the semiconductor layer 114 and the gate electrode 112, and source/drain electrodes 115 and 116 formed together with data lines (not shown) with the semiconductor layer 114 between them. The TFT supplies a pixel voltage, which is a data signal inputted through the data lines to the pixel electrode 117 in response to a scan signal supplied through the gate lines.

The pixel electrode 117 is a transparent conductive material having a high optical transmission rate. The pixel electrode 117 contacts a drain electrode 116 of the TFT with a protective layer 118 between them. The alignment film 119 for alignment of the liquid crystal is formed by applying an alignment material, such as polyimide, and performing rubbing.

Figure 4A:
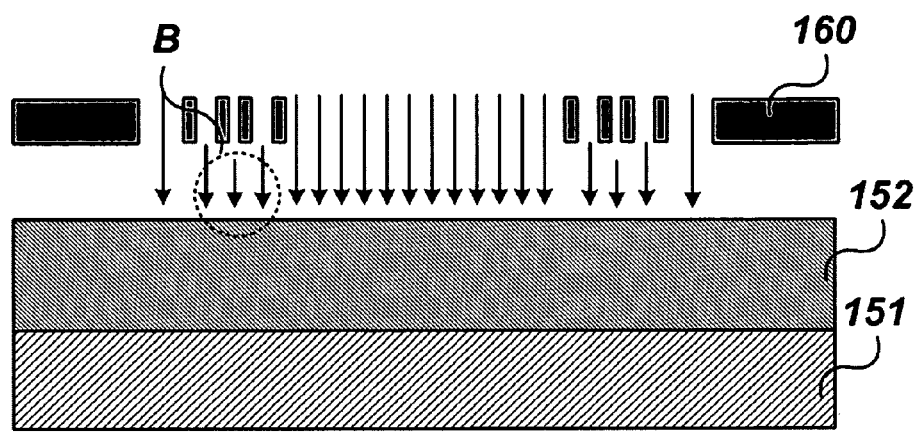
FIGS. 4A and 4B show the formation of an exemplary black matrix having overflow preventing recesses in a color filter substrate of a LCD panel in accordance with an embodiment of the present invention.
Figure 4B:
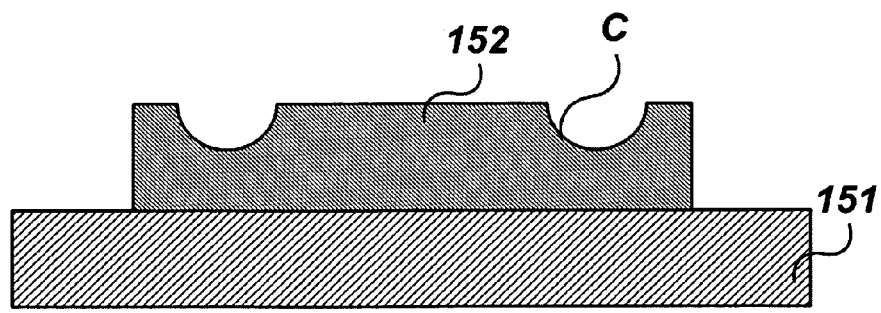

FIGS. 4A and 4B show the formation of an exemplary black matrix having overflow preventing recesses in a color filter substrate of a LCD panel in accordance with an embodiment of the present invention. Referring to FIG. 4A, the black matrix 152 may be formed of a resin, which is an organic material, by light exposure through a mask 160 having a plurality of slits. The amount of light incident onto the surface of the black matrix 152 is controlled by the width of the slits and the distance between the slits. For example, more light propagates through a large opening at first central portion of the mask 160 than at the portion B of the mask where the slits are narrower. The black matrix 152 is solidified by exposure to light. An unexposed portion of the black matrix 152 can be removed in a subsequent process. Thus, referring to the portion C of FIG. 4B, well-shaped recesses are formed on the surface of the black matrix 152 in the positions scarcely exposed to light transmitted through the slits at portion B (shown in FIG. 4A) in the mask 160.

Figure 5A:
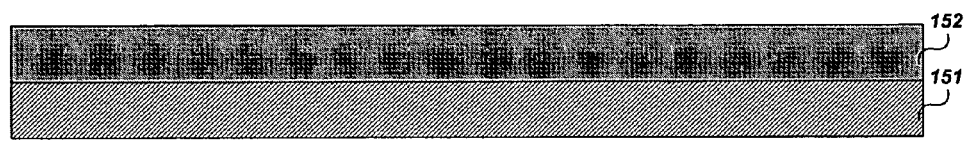
FIGS. 5A to 5E show the formation of an exemplary color filter substrate for an LCD panel in accordance with an embodiment of the present invention.

FIGS. 5A to 5E show the formation of an exemplary color filter substrate for an LCD panel in accordance with an embodiment of the present invention. Referring to FIG. 5A, an opaque material 152, such as an opaque resin and an opaque metal, is deposited on an entire surface of the first transparent insulation substrate 151.

Figure 5B:
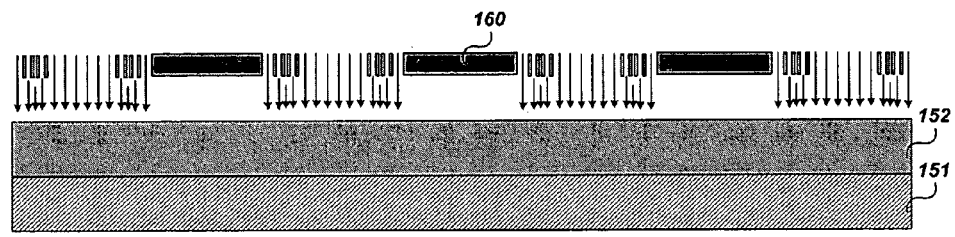

Referring to FIG. 5B, the opaque material 152, for example an opaque resin, is exposed to light through a mask 160 having slits. The opaque material 152 has a property that it is solidified upon light exposure.

Figure 5C:
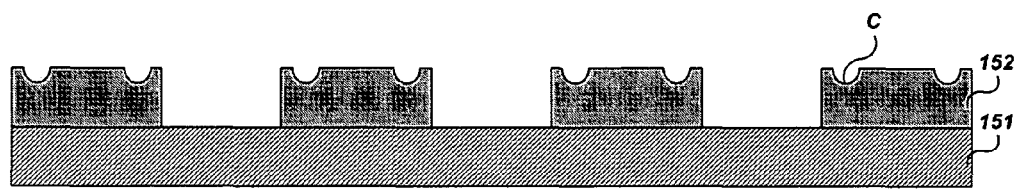

Thus, referring to FIG. 5C, the exposed opaque material 152 is patterned by removing the portion of the opaque material 152 not exposed to light to form the black matrix 152. Well-shaped patterns are also formed at portions C on each side of the black matrix 152. The wells are formed on the surface of the black matrix 152 in positions scarcely exposed to light transmitted through the slits at portion B of the mask 160. Pixel areas are defined by the black matrix 152 including the well-shaped recess thereon. In short, the overflow preventing recesses are formed on each side of a surface of the black matrix 152 to prevent overflow during the formation of the color filter 153.

In another embodiment, opaque material for the black matrix 152 is a thin film of metal, such as chrome (Cr). Then, the overflow preventing recesses may be formed by etching the metal thin film.

Figure 5D:
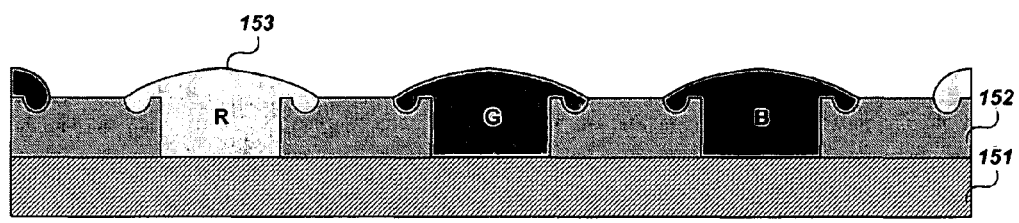

Subsequently, referring to FIG. 5D, the color filter 153 is formed in the pixel area to display R, G and B colors. Herein, the color filter 153 is formed by using a color photo resist including a pigment or dripping a color ink in an ink-jet method. When the color filter 153 is formed in the ink-jet method, R, G and B color filters 153 may be concurrently formed.

Thus, although overflow may occur due to the color ink or the color photo resist, the overflow preventing recesses can prevent a color ink or a color photo resist from one pixel area from mixing with a color ink or a color photo resist in another pixel area.

Figure 5E:
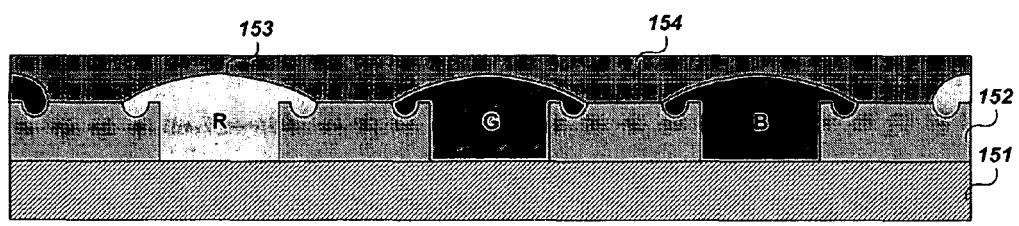

Referring to FIG. 5E, an overcoat layer 154 may be formed to planarize the surface of the color filter 153 by depositing an organic material on the entire surface of the black matrix 152 and the color filter 153.

The color filter, which is formed as described above, can be easily applied not only to a TN-type LCD panel but also an IPS-type liquid crystal display panel and a vertical alignment (VA)-type liquid crystal display panel. The color filter substrate 150 prepared as described above goes through inspection and enters a liquid crystal cell preparation process such as a fabrication of a TFT substrate 110.

In accordance with an embodiment of the present invention, the overflow preventing recesses on the surface of the black matrix can prevent the ink or the color photo resist overflowing from a dripping ink or a color photo resist from mixing with one another.

It will be apparent to those skilled in the art that various modifications and variations can be made in embodiments of the present invention. Thus, it is intended that embodiments of the present invention cover the modifications and variations of the embodiments described herein provided they come within the scope of the appended claims and their equivalents.

What is claimed is:

1. A color filter substrate for a liquid crystal display device, comprising:
   a transparent insulation substrate;
   a black matrix having a bank defining first and second pixel areas on the transparent insulation substrate, the bank having first and second recesses; and
   first and second color filters in the first and second pixel areas for displaying first and second colors, respectively,
   wherein the first color filter comprises a first color material, and the second color filter comprises a second color material,
   wherein the first recess is formed on an upper surface of the bank surrounding the first pixel area to contain the first color material overflown from the first pixel area, the second recess is formed on the upper surface of the bank surrounding the second pixel area to contain the second color material overflown from the second pixel area, and the first and second recesses are apart from each other to prevent the first color material and the second color material from mixing with each other, and
   wherein both of the first and second recesses are positioned between the first and second pixel areas which are directly adjacent to each other, and a depth of each recess is smaller than a thickness of the black matrix.

2. The color filter substrate as claimed in claim 1, wherein each of the color filters includes one of a photo resist with a pigment and a color ink.

3. The color filter substrate as claimed in claim 1, wherein each of the recesses is shaped as a well.

4. The color filter substrate as claimed in claim 1, wherein the black matrix includes a resin.

5. The color filter substrate as claimed in claim 1, wherein the black matrix includes a thin film of metal.

6. The color filter substrate as claimed in claim 1, further comprising:
   an overcoat layer on the color filters and the black matrix to planarize the surface of the color filters.

7. A method for manufacturing a color filter for a liquid crystal display device including a transparent insulating substrate, comprising:
   forming a black matrix having a bank defining first and second pixel areas on the transparent insulation substrate;
   forming a first recess on an upper surface of the bank surrounding the first pixel area to contain a first color from the first pixel area;
   forming a second recess on the surface of the bank surrounding the second pixel area to contain a second color from the second pixel area;
   providing the first color material of a first color filter into the first pixel area and into the first recess; and
   providing the second color material of a second color filter into the second pixel area and into the second recess,
   wherein both of the first and second recesses positioned between the first and second pixel areas which are directly adjacent to each other and a depth of each recess is smaller than a thickness of the black matrix, and the first and second recesses are apart from each other on the upper surface of the bank to prevent the first color material and the second color material from mixing with each other.

8. The method of claim 7, wherein the recesses are shaped as wells.

9. The method of claim 7, wherein the black matrix is formed of a resin.

10. The method of claim 9, wherein forming the recesses including exposing the resin to light through a plurality of slits.

11. The method of claim 7, wherein the black matrix includes a thin film of metal.

12. The method of claim 11, wherein the recesses are formed by etching the metal thin film.

13. The method of claim 7, wherein forming the first and second color filters including using a color photo resist containing a pigment.

14. The method of claim 7, wherein forming the first and second color filters including dripping a color ink.

15. The method of claim 7, wherein forming the first and second color filters is concurrently performed.

16. The method of claim 7, further comprising forming an overcoat layer on the first and second color filters and the black matrix to planarize a surface of the first and second color filters.

17. The method of claim 16, wherein forming the overcoat layer including depositing an organic material on the surface of the first and second color filters.

18. The method of claim 7, wherein the forming the recesses including scarcely exposing the black matrix by transmitting light through slits in a mask.

19. The method of claim 7, wherein the forming the recesses including controlling an amount of light incident onto the surface of the black matrix by a width of slits in a mask.

20. The method of claim 7, wherein the forming the recesses including solidifying portions of the black matrix by exposing to a light and removing portions thereof that are unexposed to the light.

* * * * *